(12) United States Patent
Aizawa et al.

(10) Patent No.: US 10,583,772 B2
(45) Date of Patent: *Mar. 10, 2020

(54) VEHICLE LAMP HAVING A LEVELING ACTUATOR COUPLED TO AN AIMING NUT

(71) Applicant: KOITO MANUFACTURING CO., LTD., Tokyo (JP)

(72) Inventors: Daisuke Aizawa, Shizuoka (JP); Keiichi Tajima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,249

(22) Filed: Sep. 25, 2018

(65) Prior Publication Data

US 2019/0092220 A1    Mar. 28, 2019

(30) Foreign Application Priority Data

Sep. 25, 2017 (JP) .................................. 2017-184217

(51) Int. Cl.
| | |
|---|---|
| *B60Q 1/068* | (2006.01) |
| *B60Q 1/00* | (2006.01) |
| *B60Q 1/076* | (2006.01) |
| *F21S 41/147* | (2018.01) |
| *F21S 41/19* | (2018.01) |

(Continued)

(52) U.S. Cl.
CPC ......... *B60Q 1/0683* (2013.01); *B60Q 1/0064* (2013.01); *B60Q 1/076* (2013.01); *F21S 41/147* (2018.01); *F21S 41/148* (2018.01); *F21S 41/192* (2018.01); *F21S 41/25* (2018.01); *F21S 41/255* (2018.01); *F21S 41/321* (2018.01); *F21S 41/40* (2018.01); *F21S 41/657* (2018.01);

(Continued)

(58) Field of Classification Search
CPC ........ F21S 41/148; F21S 41/657; F21S 41/40; F21S 41/321; F21S 41/255; B60Q 2200/32

See application file for complete search history.

(56) References Cited

U.S. PATENT DOCUMENTS

| | | | |
|---|---|---|---|
| 7,121,706 B2 * | 10/2006 | Takiguchi | ................ B60Q 1/10 362/524 |
| 7,722,235 B2 * | 5/2010 | Mochizuki | .............. F21V 13/12 362/539 |

(Continued)

FOREIGN PATENT DOCUMENTS

JP     2006-315512 A     11/2006

*Primary Examiner* — Tracie Y Green

(74) *Attorney, Agent, or Firm* — Osha Liang LLP

(57) ABSTRACT

A vehicle lamp includes a lamp body, a lamp unit and a leveling actuator. The lamp unit is supported to the lamp body to be aimable in an upper and lower direction and in a right and left direction. The leveling actuator rotates the lamp unit in the upper and lower direction independently from rotation by the aiming. An aiming nut is mounted to the aiming screw and threadably engaged with the aiming screw. The leveling actuator comprises an actuator main body fixed and supported to the lamp unit and an output shaft member supported to the actuator main body to be moveable in the front and rear direction of the lamp. The output shaft member is disposed to protrude upward or downward from the actuator main body and is coupled to the aiming nut at a leading end portion of the output shaft member.

5 Claims, 10 Drawing Sheets

(51) Int. Cl.
    *F21S 41/25*     (2018.01)
    *F21S 41/32*     (2018.01)
    *F21S 41/255*    (2018.01)
    *F21S 41/657*    (2018.01)
    *F21S 41/148*    (2018.01)
    *F21S 41/40*     (2018.01)
    *F21S 45/47*     (2018.01)

(52) U.S. Cl.
    CPC ...... *B60Q 2200/30* (2013.01); *B60Q 2200/32* (2013.01); *F21S 45/47* (2018.01)

(56) References Cited

U.S. PATENT DOCUMENTS

| | | | |
|---|---|---|---|
| 8,147,106 B2* | 4/2012 | Eto | B60Q 1/076 |
| | | | 362/419 |
| 2009/0122567 A1* | 5/2009 | Mochizuki | F21V 13/12 |
| | | | 362/509 |
| 2010/0124070 A1* | 5/2010 | Ochiai | F21S 41/19 |
| | | | 362/512 |
| 2019/0092219 A1* | 3/2019 | Tajima | B60Q 1/0683 |

* cited by examiner

VEHICLE LAMP HAVING A LEVELING ACTUATOR COUPLED TO AN AIMING NUT

CROSS REFERENCE TO RELATED APPLICATIONS

The present application claims the benefit of priority of Japanese Patent Application No. 2017-184217, filed Sep. 25, 2017, the content of which is incorporated herein by reference.

TECHNICAL FIELD

The present disclosure relates to a vehicle lamp including a leveling actuator.

BACKGROUND ART

There has been known a vehicle lamp which includes a lamp unit which is supported to a lamp body to be aimable in an upper and lower direction and in a right and left direction, and a leveling actuator configured to rotate the lamp unit in the upper and lower direction independently from rotation by the aiming.

JP-A-2006-315512 discloses a leveling actuator which includes an actuator main body which is fixed and supported to the lamp unit, and an output shaft member which is supported to the actuator main body to be moveable in a front and rear direction of the lamp and is disposed to protrude toward a lamp rear side from the actuator main body.

In the vehicle lamp disclosed in JP-A-2006-315512, an aiming screw for aiming the lamp unit in the upper and lower direction is supported to the lamp body to be rotatable about an axis extending in the front and rear direction of the lamp, and the output shaft member of the leveling actuator is disposed to face a leading end portion of the aiming screw on the same axis as the aiming screw.

In the vehicle lamp disclosed in JP-A-2006-315512, since the output shaft member of the leveling actuator is disposed in series with the aiming screw, a summed length of the leveling actuator and the aiming screw in the front and rear direction is lengthened. For this reason, it is not easy to secure a space for disposing therein the leveling actuator.

The present disclosure has been made in view of the above circumstances, and an object thereof is to provide a vehicle lamp including a leveling actuator and capable of easily securing a space for disposing therein the leveling actuator.

SUMMARY

The present disclosure is to conceive a configuration of a leveling actuator so as to achieve the above object.

According to an aspect of the present disclosure, there is provided a vehicle lamp including:
a lamp body;
a lamp unit supported to the lamp body to be aimable in an upper and lower direction and in a right and left direction;
a leveling actuator configured to rotate the lamp unit in the upper and lower direction independently from rotation by the aiming;
an aiming screw for aiming the lamp unit in the upper and lower direction, the aiming screw being supported to the lamp body to be rotatable about an axis extending in a front and rear direction of the lamp; and
an aiming nut mounted to the aiming screw and threadably engaged with the aiming screw,
wherein the leveling actuator includes:
an actuator main body fixed and supported to the lamp unit; and
an output shaft member supported to the actuator main body to be moveable in the front and rear direction of the lamp, and
wherein the output shaft member is disposed to protrude upward or downward from the actuator main body and is coupled to the aiming nut at a leading end portion of the output shaft member.

According to the above configuration, the vehicle lamp includes the leveling actuator configured to rotate the lamp unit in the upper and lower direction independently from the rotation by the aiming. However, since the output shaft member of the leveling actuator is coupled at the leading end portion thereof to the aiming nut that is threadably engaged with the aiming screw for aiming the lamp unit in the upper and lower direction, the leveling can be performed by moving the output shaft member relative to the actuator main body in the front and rear direction of the lamp.

The output shaft member of the leveling actuator is disposed to protrude upward or downward from the actuator main body fixed and supported to the lamp unit and is not disposed in series with the aiming screw, unlike the conventional structure. Therefore, it is possible to reduce a summed length of the leveling actuator and the aiming screw in the front and rear direction, so that it is possible to easily secure a space for disposing therein the leveling actuator.

According to the present disclosure, it is possible to easily secure the space for disposing therein the leveling actuator in the vehicle lamp including the leveling actuator.

DETAILED DESCRIPTION OF EMBODIMENTS

Hereinafter, embodiments of the present disclosure will be described with reference to the drawings.

Figure 1:
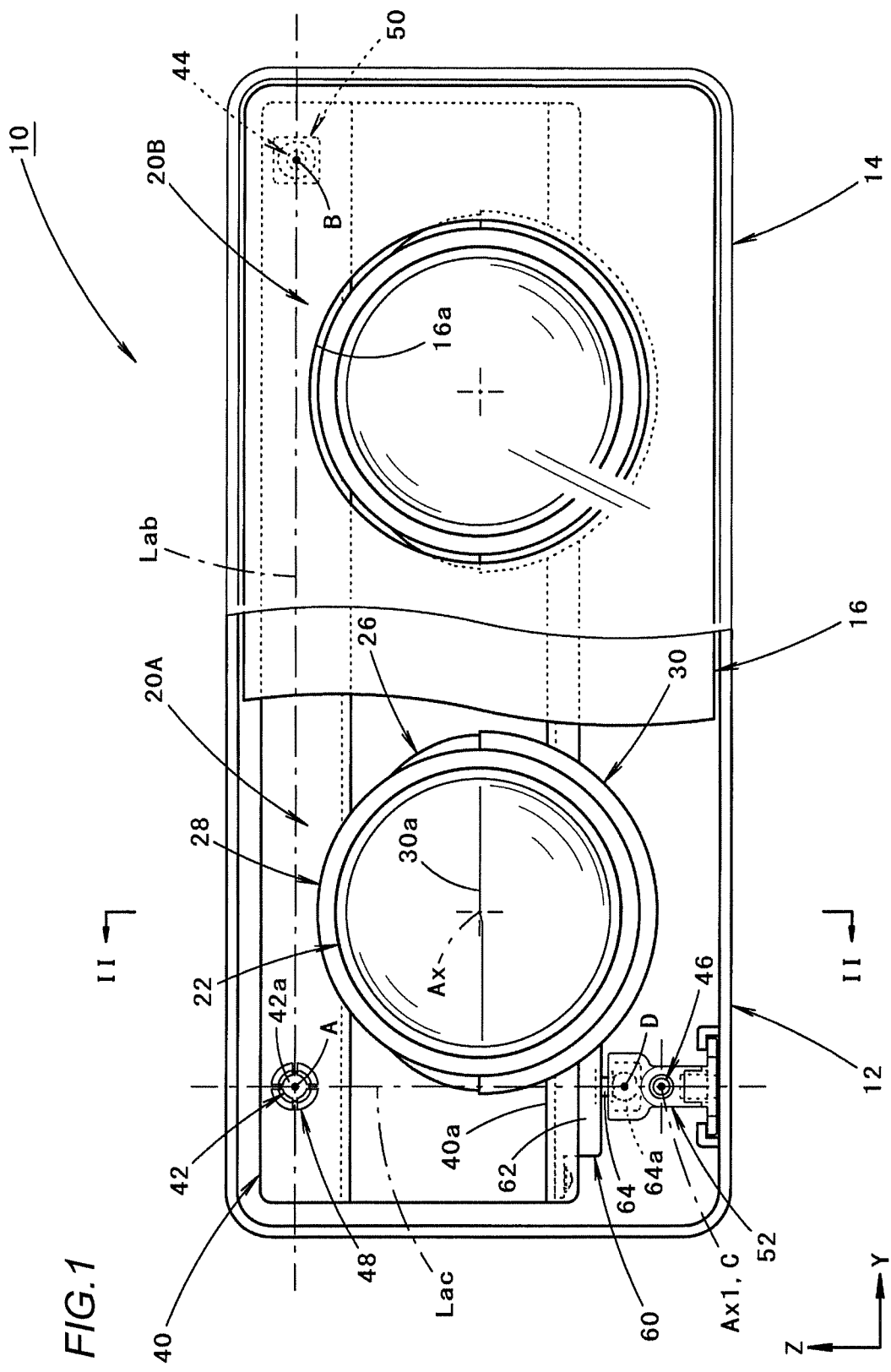
FIG. 1 is a front view depicting a vehicle lamp in accordance with an embodiment of the present disclosure.
Figure 2:
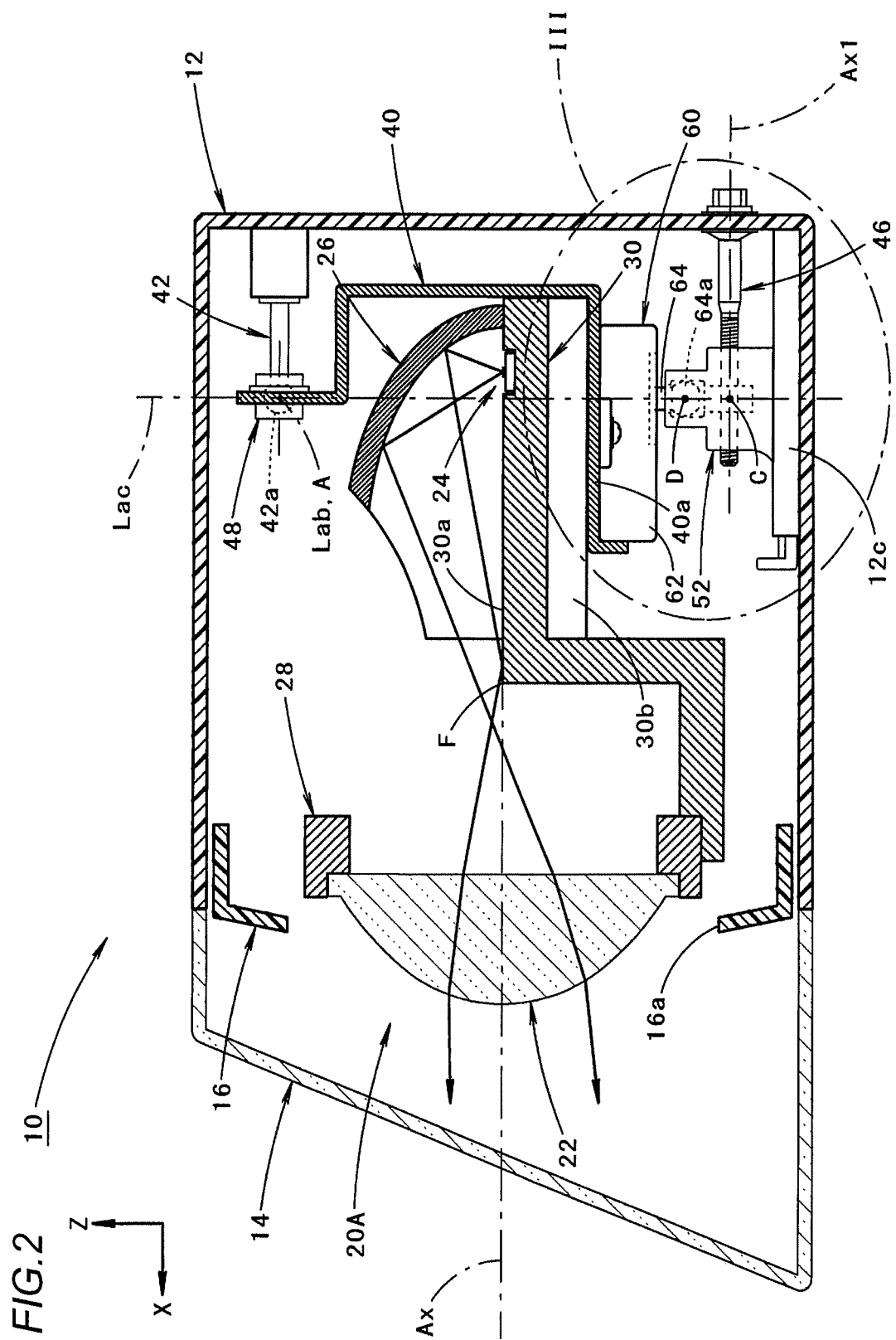
FIG. 2 is a sectional view taken along a line II-II of FIG. 1.

FIG. 1 is a front view depicting a vehicle lamp 10 in accordance with an embodiment of the present disclosure. FIG. 2 is a sectional view taken along a line II-II of FIG. 1.

In the drawings, a direction denoted with a reference numeral X is a "front" of a lamp ("front" of a vehicle), a direction denoted with a reference numeral Y is a "left direction" (a "left direction" of the vehicle; a "right direction", as seen from the lamp front side) perpendicular to the "front", and a direction denoted with a reference numeral Z is an "upper direction".

As shown in FIG. 1, the vehicle lamp 10 of the embodiment is a headlamp arranged at a right front end portion of a vehicle and has a configuration where a lamp unit 20A for low beam irradiation and a lamp unit 20B for high beam irradiation are arranged side by side in a vehicle width direction to be accommodated in a lamp chamber formed by a lamp body 12 and a translucent cover 14 that is transparent and is mounted to a front opening of the lamp body.

In the lamp chamber, an extension panel 16 formed to surround the two lamp units 20A, 20B is disposed in the vicinity of the front of the lamp units. The extension panel 16 is formed with circular openings 16a for enabling light irradiation from the lamp units 20A, 20B at positions corresponding to the respective lamp units 20A, 20B.

The two lamp units 20A, 20B are supported to the lamp body 12 via a common bracket 40.

The bracket 40 is supported to the lamp body 12 to be rotatable in an upper and lower direction and in a right and left direction by a pivot 42 positioned at a right upper side (a left upper side, as seen from the lamp front side) and two aiming screws 44, 46 positioned at a left upper side and a right lower side.

Also, a leveling actuator 60 for rotating the two lamp units 20A, 20B in the upper and lower direction together with the bracket 40, independently from rotation by the aiming, is fixed and supported to the bracket 40.

The two lamp units 20A, 20B are all configured as a projector-type lamp unit.

As shown in FIG. 2, the lamp unit 20A for low beam irradiation positioned at the right includes a projection lens 22 having an optical axis Ax extending in the front and rear direction of the vehicle, a light emitting device 24 arranged at the rear of a rear focus F of the projection lens 22, and a reflector 26 disposed to cover the light emitting device 24 from above and configured to reflect light from the light emitting device 24 toward the projection lens 22.

The light emitting device 24 and the reflector 26 are supported to a base member 30, and the projection lens 22 is supported to the base member 30 via a lens holder 28.

The base member 30 is formed with an upward reflection surface 30a configured to reflect upward a part of reflected light from the reflector 24 and to cause the same to be incident on the projection lens 22 so as to form a cutoff line of a light distribution pattern for low beam.

A lower surface of the base member 30 is formed with a plurality of heat radiation fins 30b, so that the base member 30 functions as a heat sink.

The lamp unit 20A is fixed and supported to the bracket 40 at the base member 30.

In the meantime, a part of the configuration of the lamp unit 20B is different from the lamp unit 20A so as to perform high beam irradiation but the other configuration is similar to the lamp unit 20A.

The bracket 40 extends in the vehicle width direction at the rear of the two lamp units 20A, 20B, and a lower end portion thereof is formed with a lower wall part 40a configured to support the two lamp units 20A, 20B and extending toward the lamp front side.

The pivot 42 positioned at the right upper side in the lamp chamber is disposed to extend in the front and rear direction of the lamp, and a leading end portion (front end portion) 42a is formed into a spherical shape. The pivot 42 is fixed and supported at its base end portion to the lamp body 12. The pivot 42 is engaged at the leading end portion 42a with a spherical step bearing 48 mounted to the bracket 40 so as to be rotatable in all directions.

The aiming screw 44 (refer to FIG. 1) positioned at the left upper side in the lamp chamber is disposed to extend in the front and rear direction of the lamp, and is rotatably supported at its base end portion (rear end portion) to the lamp body 12. The aiming screw 44 is threadably engaged with an aiming nut 50 mounted to the bracket 40, in the vicinity of the leading end thereof. The aiming nut 50 is mounted to the bracket 40 in an aspect where the bracket 40 can rotate to some extent in the front and rear direction about a threadably engaged position B with the aiming screw 44.

The aiming screw 46 positioned at the right lower side in the lamp chamber is also disposed to extend in the front and rear direction of the lamp, and is rotatably supported at its base end portion (rear end portion) to the lamp body 12. An aiming nut 52 to be threadably engaged with the aiming screw 46 is mounted in the vicinity of a leading end of the aiming screw 46. The aiming nut 52 is supported to the bracket 40 via the leveling actuator 60.

As shown in FIG. 1, an engaging position A of the leading end portion 42a of the pivot 42 and the spherical step bearing 48 is located at the same height as the threadably engaged position B of the aiming screw 44 and the aiming nut 50. However, the engaging position A is displaced toward the lamp rear side relative to the threadably engaged position B. In the meantime, a threadably engaged position C of the aiming screw 46 and the aiming nut 52 is located directly below the engaging position A.

When aiming the two lamp units 20A, 20B in the upper and lower direction, since a rotation central axis Lab becomes a line connecting the engaging position A and the threadably engaged position B, it becomes a line extending in a direction inclined to the lamp rear side from the threadably engaged position B toward the engaging position A in a horizontal plane.

On the other hand, when aiming the two lamp units 20A, 20B in the right and left direction, a rotation central axis Lac is a line extending in the vertical direction connecting the engaging position A and the threadably engaged position C and a coupling position D (which will be described later) located directly below the engaging position A.

Figure 3:
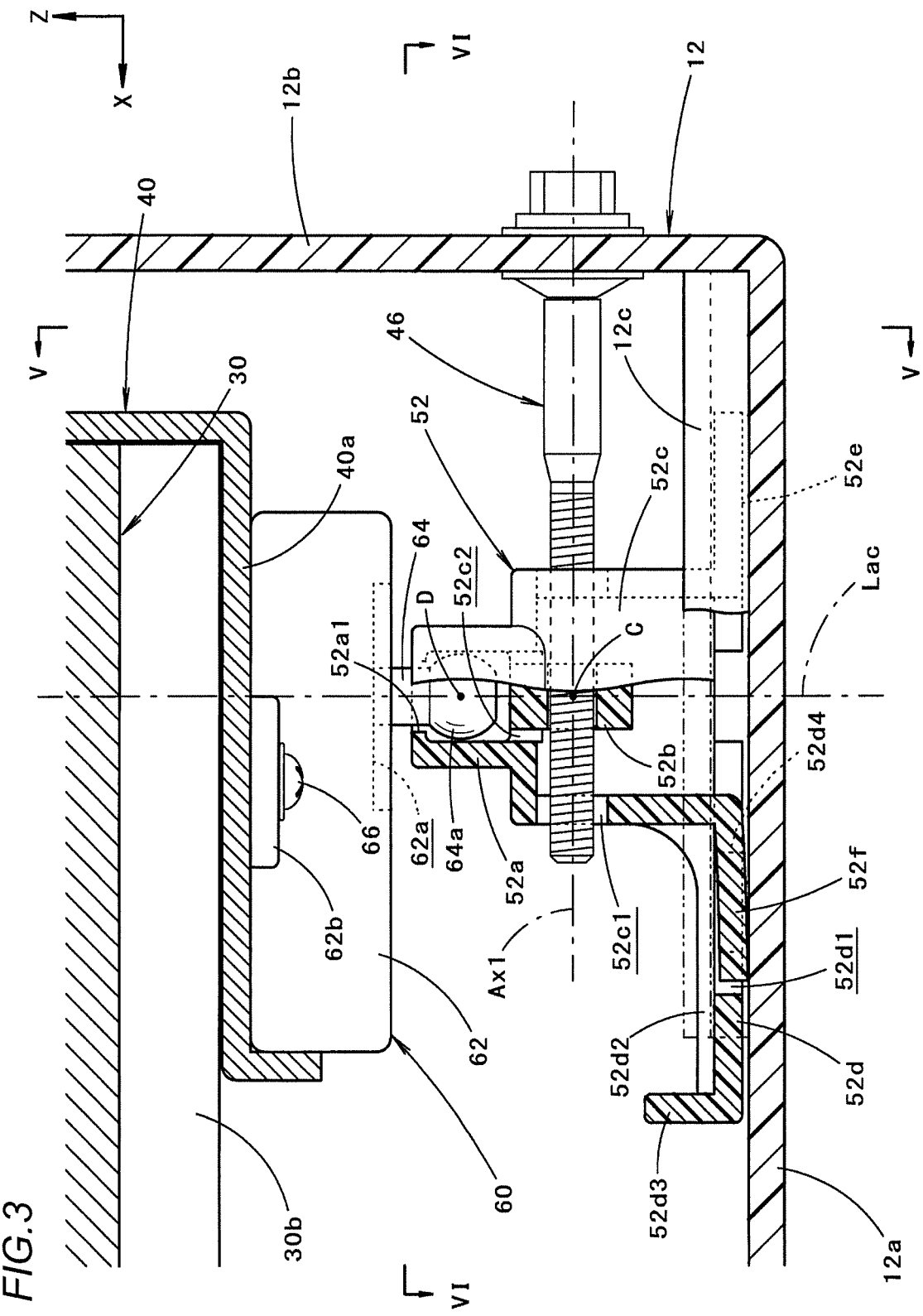
FIG. 3 is a detailed view of a III part of FIG. 2.
Figure 4:
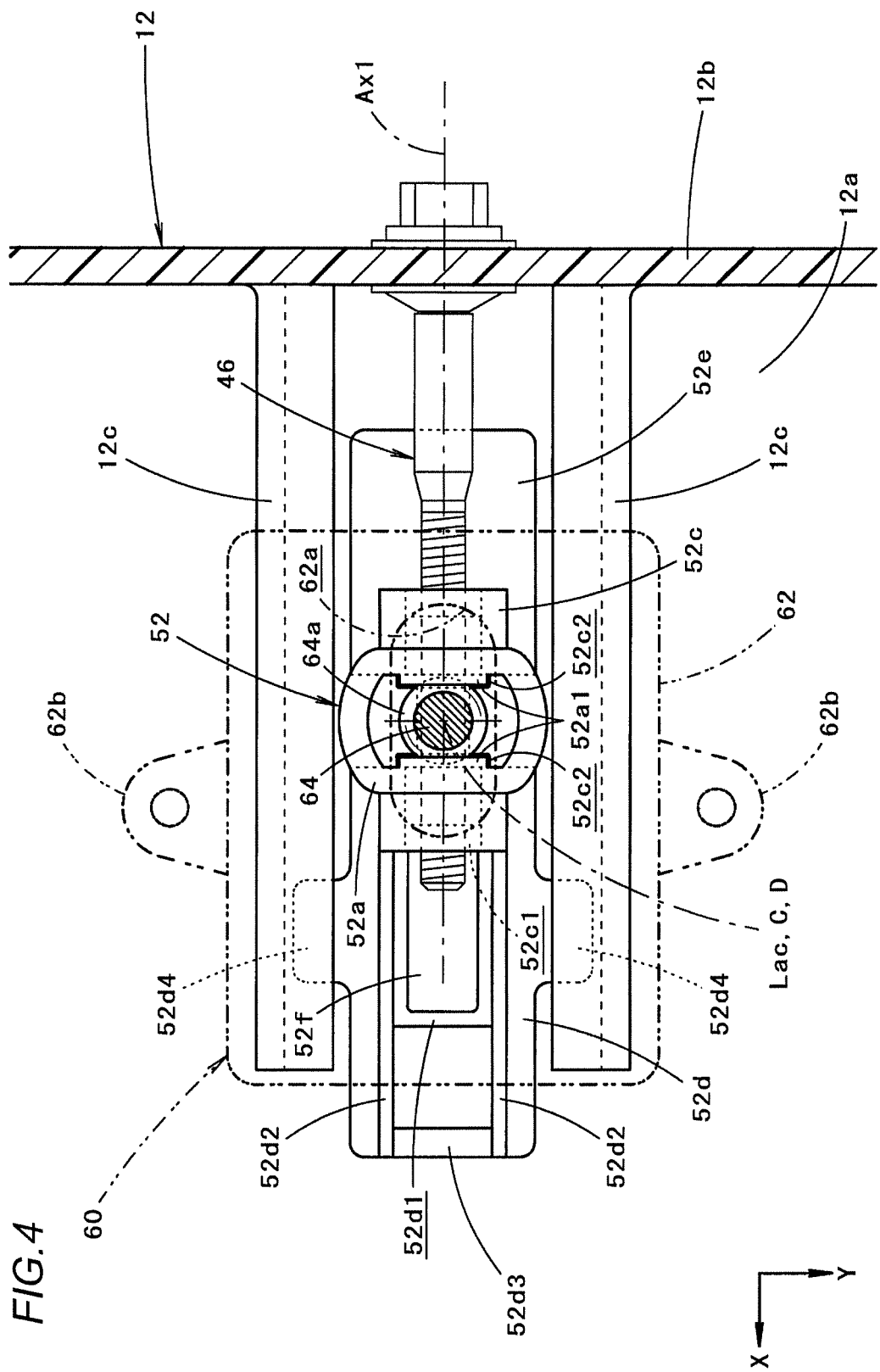
FIG. 4 is a sectional view taken along a line IV-IV of FIG. 3.
Figure 5:
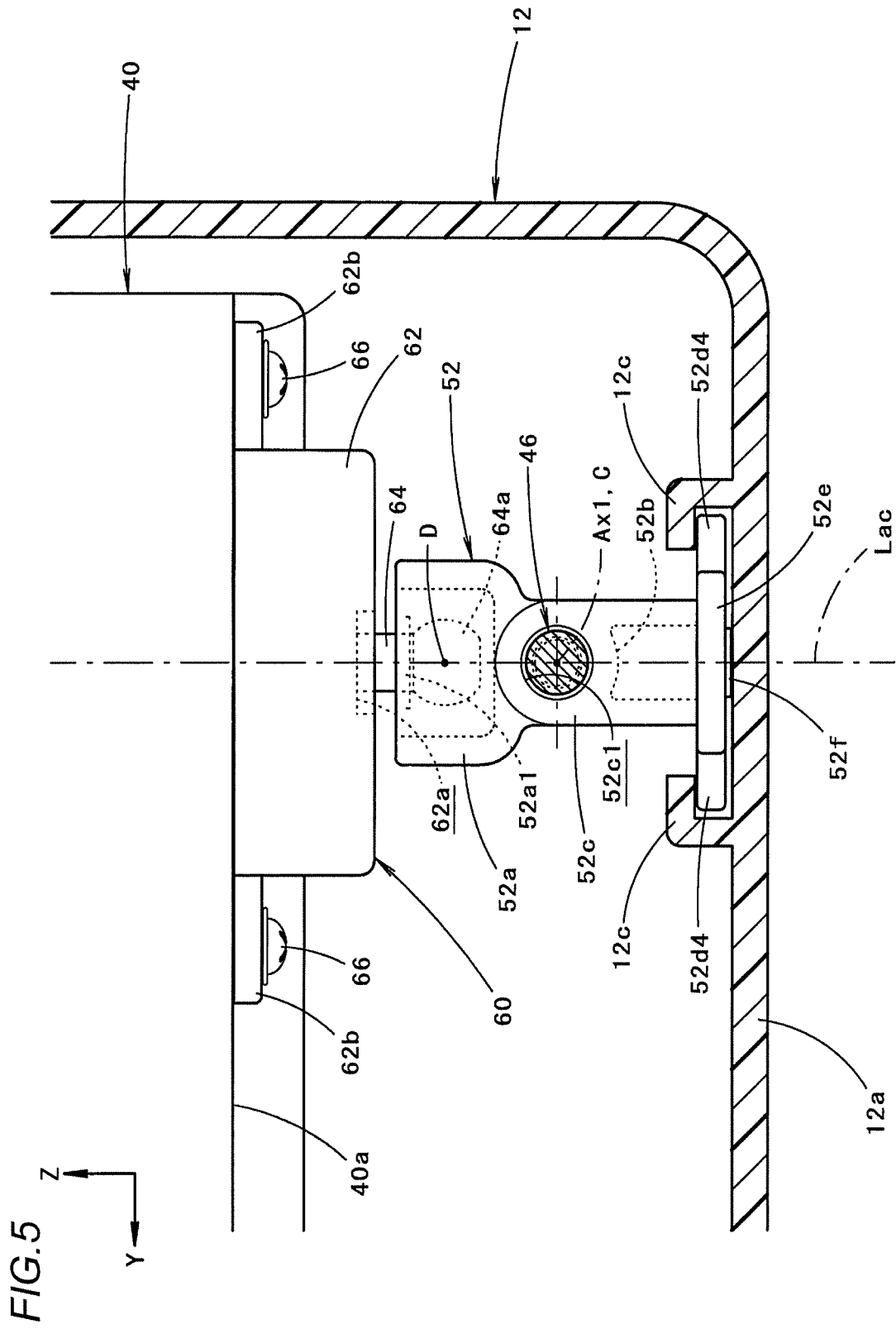
FIG. 5 is a sectional view taken along a line V-V of FIG. 3.
Figure 6:
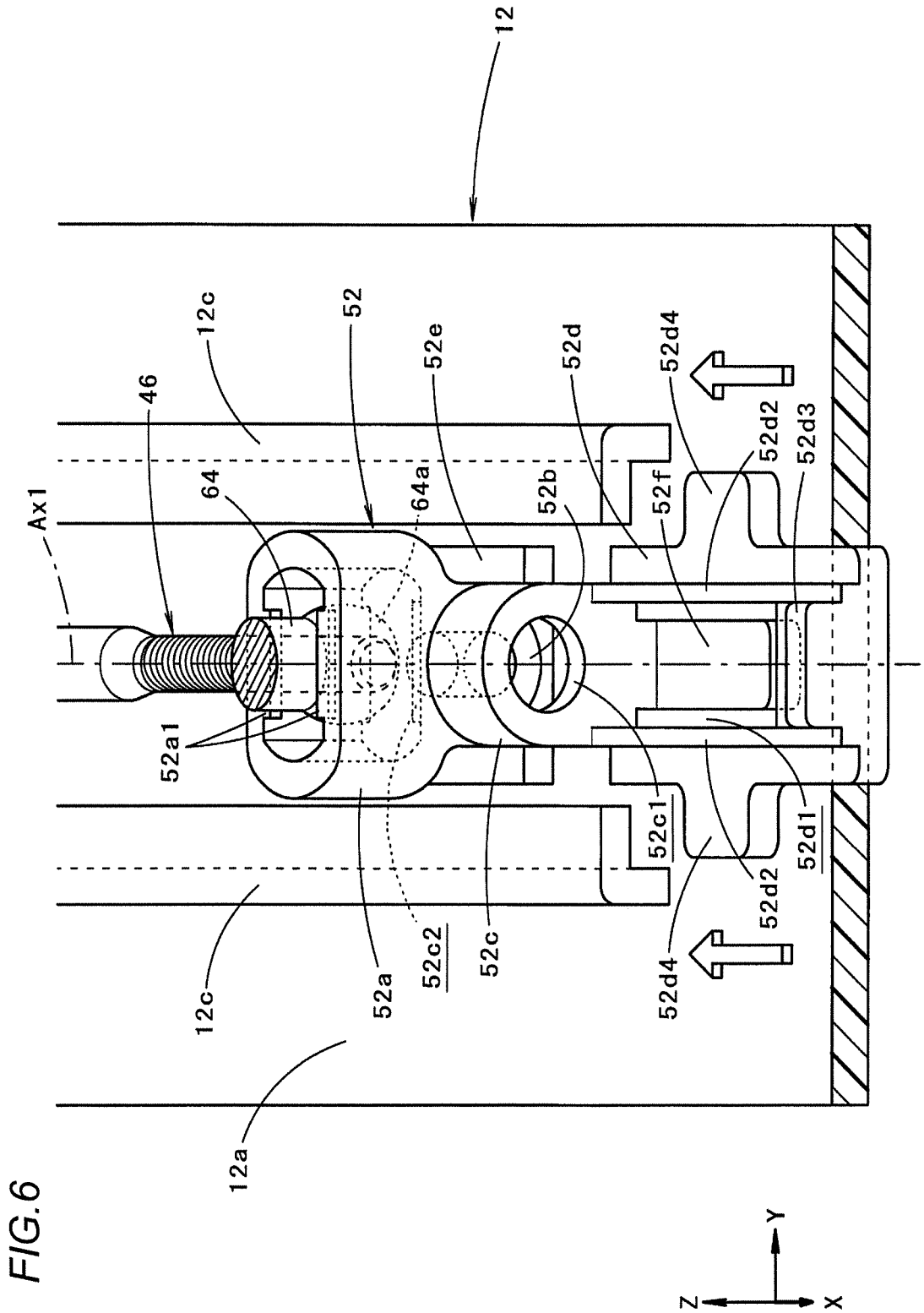
FIG. 6 is a perspective view partially depicting the vehicle lamp, as seen from an oblique upper front side.

FIG. 3 is a detailed view of a III part of FIG. 2. FIG. 4 is a sectional view taken along a line IV-IV of FIG. 3, and FIG. 5 is a sectional view taken along a line V-V of FIG. 3. FIG. 6 is a perspective view partially depicting the vehicle lamp 10, as seen from an oblique upper front side.

As shown in the drawings, the leveling actuator 60 includes an actuator main body 62 fixed and supported to the lower wall part 40a of the bracket 40 and an output shaft member 64 supported to the actuator main body 62 to be moveable in the front and rear direction of the lamp.

A lower wall part of the actuator main body 62 is formed with a long hole 62a extending in the front and rear direction of the lamp. The output shaft member 64 is disposed to protrude downward (specifically, directly below) from the long hole 62a of the actuator main body 62. Also, both left and right side surfaces of the actuator main body 62 are formed with tabs 62b having holes at upper end portions thereof. The leveling actuator 60 is fixed to the lower wall part 40a of the bracket 40 by fastening screws 66 into the respective tabs 62b.

A leading end portion 64a of the output shaft member 64 has a spherical shape of which a diameter is larger than a shaft part of the output shaft member. A tip portion of the leading end portion 64a has a planar shape. The output shaft member 64 is coupled at the leading end portion 64a to the aiming nut 52.

The leading end portion 64a of the output shaft member 64 and the aiming nut 52 are coupled in a vertical surface including an axis Ax1 extending in the front and rear direction of the lamp and becoming a rotation center of the aiming screw 46. That is, the coupling position D of the leading end portion 64a of the output shaft member 64 and the aiming nut 52 is located in the same vertical surface as the threadably engaged position C.

Also, in the embodiment, the coupling position D is set to a position directly above the threadably engaged position C (i.e., on the rotation central axis Lac).

The aiming nut 52 is an injection-molded product made of resin, and is supported to the lamp body 12 to be slidable in the front and rear direction of the lamp.

An upper part of the aiming nut 52 is formed with a concave part 52a for fitting therein the leading end portion 64a of the output shaft member 64.

The concave part 52a has an inner peripheral shape with which the leading end portion 64a of the output shaft member 64 fitted in the concave part 52a is relatively displaceable in the upper and lower direction and in the right and left direction by predetermined amounts, respectively.

Specifically, the concave part 52a has a pair of front and rear vertical surfaces formed into a planar shape having a width slightly larger than the diameter of the leading end portion 64a of the output shaft member 64, a pair of left and right vertical surfaces formed as a part of a cylindrical surface larger to some extent than the diameter of the leading end portion 64a of the output shaft member 64, and a bottom wall surface formed at a position slightly deeper than a vertical width of the leading end portion 64a of the output shaft member 64. Also, upper end portions of the pair of front and rear vertical surfaces of the concave part 52a are formed with protrusions 52a1 for preventing the leading end portion 64a of the output shaft member 64 fitted in the concave part 52a from separating from the concave part 52a so as to extend over a predetermined length in the right and left direction.

Thereby, the output shaft member 64 of which the leading end portion 64a is fitted in the concave part 52a correctly transmits movement thereof in the front and rear direction of the lamp to the aiming nut 52, and allows a slight play in the upper and lower direction and a relatively large play in the right and left direction.

A screw engaging part 52b of the aiming nut 52, which is to be threadably engaged with the aiming screw 46, is positioned directly below the concave part 52a.

The aiming nut 52 has a dome part 52c extending in the front and rear direction of the lamp with surrounding the aiming screw 46. An upper end portion of the dome part 52c extends in both the front and rear directions from a lower end portion of the concave part 52a and an upper end portion of the screw engaging part 52b and is formed into a semi-cylindrical shape. Wall parts of both front and rear ends of the dome part 52c are formed with openings 52c1 for inserting therein the aiming screw 46. Also, the upper end portion of the dome part 52c is formed with slits 52c2 larger than the protrusions 52a1 at portions directly below the pair of front and rear protrusions 52a1 formed at the concave part 52a at both the front and rear sides of the screw engaging part 52b.

The aiming nut 52 has a front flat plate part 52d extending from a lower end portion of the dome part 52c toward the lamp front side and a rear flat plate part 52e extending toward the lamp rear side. The front flat plate part 52d and the rear flat plate part 52e are all formed to extend along the horizontal plane with a left and right width larger than the dome part 52c.

The front flat plate part 52d is formed with a rectangular opening 52d1 extending in the front and rear direction of the lamp with a width narrower than the dome part 52c. In the opening 52d1, a rectangular elastic piece 52f extending in the front and rear direction of the lamp is disposed. The elastic piece 52f has a cantilever shape extending slightly downward from a lower end position of a front wall part of the dome part 52c toward the lamp front side.

Also, the front flat plate part 52d is formed with a pair of left and right bead portions 52d2 extending from the lower end portion of the front wall part of the dome part 52c to a front end edge of the front flat plate part 52d along both left and right edges of the opening 52d1, and a front end portion thereof is formed with a flange portion 52d3 extending upward along the front end edge of the front flat plate part 52d.

Also, the front flat plate part 52d is formed at an intermediate position in the front and rear direction of the lamp with a pair of left and right tab portions 52d4 protruding in both left and right directions from both left and right side surfaces of the front flat plate part 52d.

In the meantime, the rear flat plate part 52e is formed into a flat plate shape having a front and rear length shorter than the front flat plate part 52d.

The lamp body 12 is formed with a pair of left and right slide engaging parts 12c for supporting the aiming nut 52 to be slidable in the front and rear direction of the lamp. The pair of left and right slide engaging parts 12c is formed on an upper surface of a lower surface wall 12a of the lamp body 12 so as to extend forward in parallel with each other from a rear surface wall 12b of the lamp body 12. The pair of left and right slide engaging parts 12c has L-shaped sections facing each other, and a front and rear length thereof is slightly longer than the aiming nut 52.

As shown in FIG. 6, the aiming nut 52 is mounted to the lamp body 12 from the lamp front side toward a direction shown with the arrow in FIG. 6 in a state where the leading end portion 64a of the output shaft member 64 is fitted in the concave part 52a.

That is, after the rear flat plate part 52e of the aiming nut 52 is inserted between the pair of left and right slide engaging parts 12c, the screw engaging part 52b of the aiming nut 52 is inserted into the leading end portion of the aiming screw 46 to threadably engage with the aiming screw 46 and is moved to the lamp rear side. Then, after the pair of left and right tab portions 52d4 of the front flat plate part 52d of the aiming nut 52 is engaged with the pair of left and right slide engaging parts 12c, the aiming nut 52 is further moved to a predetermined position toward the lamp rear side, so that the aiming nut is mounted to the lamp body 12.

At this time, when the flange portion 52d3 of the aiming nut 52 is pushed from the lamp front side by a finger, the aiming nut 52 can be easily moved toward the lamp rear side along the upper surface of the lower surface wall 12a of the lamp body 12. Also, at this time, the elastic piece 52f is contacted to the lower surface wall 12a and is thus elastically deformed, so that the pair of left and right tab portions 52d4 can be easily engaged with the pair of left and right slide engaging parts 12c.

Figure 7:
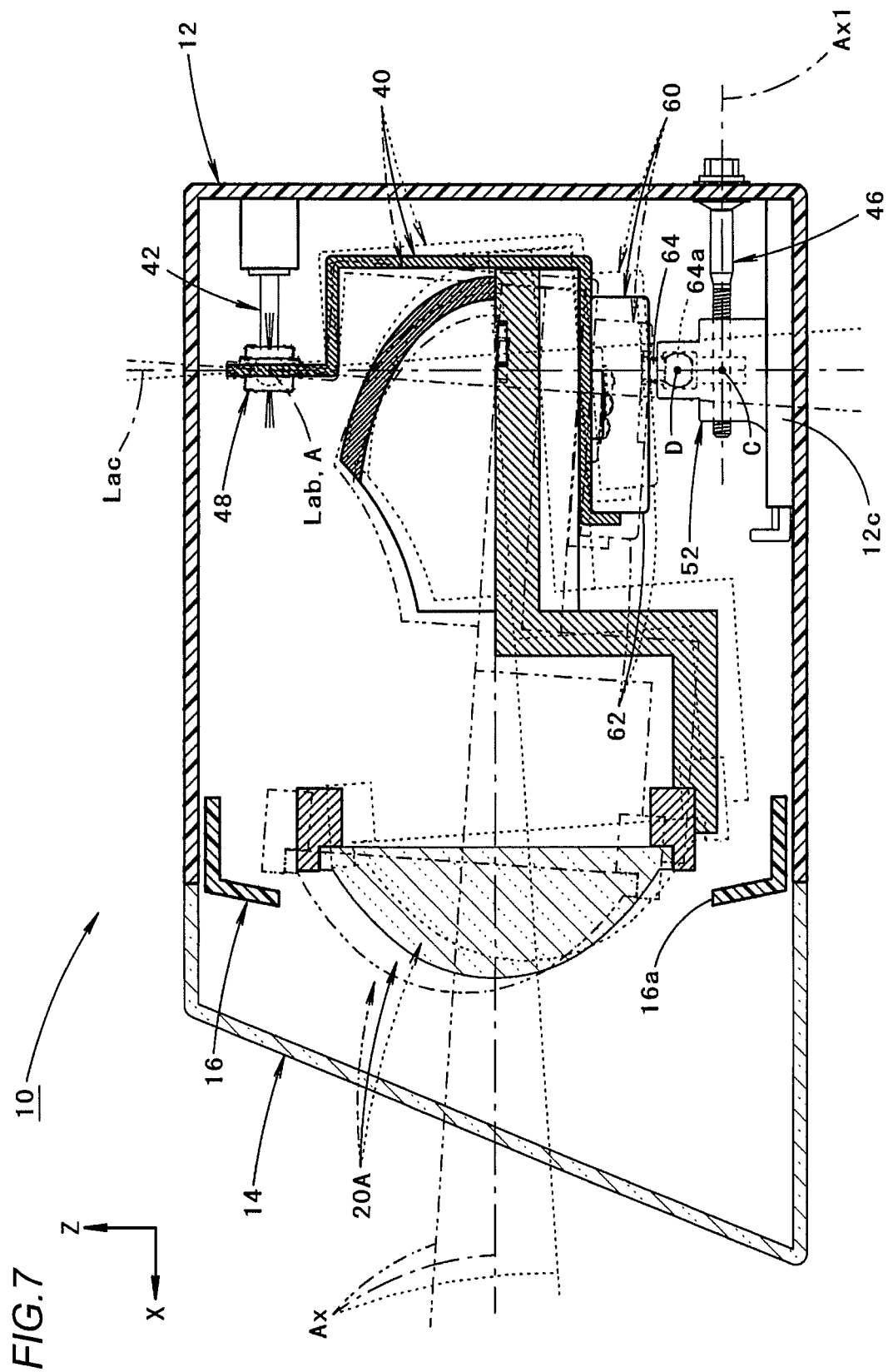
FIG. 7 is a view similar to FIG. 2 for illustrating a leveling function of the vehicle lamp.

FIG. 7 is a view similar to FIG. 2 for illustrating a leveling function of the vehicle lamp 10 of the embodiment.

FIG. 7 depicts an aspect where the lamp unit 20A is subjected to leveling together with the bracket 40 in both the upper and lower directions from an aiming reference position in the upper and lower direction by driving of the leveling actuator 60.

As shown with the solid line in FIG. 7, in a state where the lamp unit 20A is located at the aiming reference position in the upper and lower direction and is not subjected to the leveling, the optical axis Ax extends horizontally in the front and rear direction of the lamp.

As shown with the dashed-two dotted line in FIG. 7, when leveling upward the lamp unit 20A, the output shaft member 64 of the leveling actuator 60 moves relative to the actuator main body 62 toward the lamp rear side. At this time, since the leading end portion 64*a* of the output shaft member 64 is coupled to the aiming nut 52, which is located at the aiming reference position in the upper and lower direction, at the coupling position D, the actuator main body 62 is actually moved toward the lamp front side. Thereby, the lamp unit 20A is rotated upward about the rotation central axis Lab, together with the bracket 40, and the optical axis Ax extends obliquely upwards.

On the other hand, as shown with the dotted line in FIG. 7, when leveling downward the lamp unit 20A, the output shaft member 64 of the leveling actuator 60 moves relative to the actuator main body 62 toward the lamp front side. However, actually, the actuator main body 62 moves toward the lamp rear side. Thereby, the lamp unit 20A is rotated downward about the rotation central axis Lab, together with the bracket 40, and the optical axis Ax extends obliquely downwards.

Subsequently, operational effects of the embodiment are described.

The vehicle lamp 10 of the embodiment includes the leveling actuator 60 for rotating the lamp unit 20A in the upper and lower direction, independently from the rotation by the aiming. Since the output shaft member 64 of the leveling actuator 60 is coupled at the leading end portion 64*a* to the aiming nut 52 that is threadably engaged with the aiming screw 46 for aiming the lamp unit 20A in the upper and lower direction, it is possible to perform the leveling by moving the output shaft member 64 relative to the actuator main body 62 in the front and rear direction of the lamp.

At this time, the output shaft member 64 of the leveling actuator 60 is disposed to protrude downward from the actuator main body 62 fixed and supported to the lamp unit 20A and is not disposed in series with the aiming screw 46, unlike the related art. Therefore, it is possible to reduce a summed length of the leveling actuator 60 and the aiming screw 46 in the front and rear direction, so that it is possible to easily secure a space for disposing therein the leveling actuator 60.

According to the embodiment, it is possible to easily secure the space for disposing therein the leveling actuator 60 in the vehicle lamp 10 including the leveling actuator 60.

Also, in the embodiment, the aiming nut 52 is supported to the lamp body 12 to be slidable in the front and rear direction of the lamp. Therefore, it is possible to prevent in advance a situation where when the aiming screw 46 is rotated so as to aim the lamp unit 20A in the upper and lower direction, the aiming nut 52 also intends to rotate and an excessive force is thus applied to the coupled part with the output shaft member 64 of the leveling actuator 60.

At this time, the aiming nut 52 is formed with the elastic piece 52*f* configured to elastically press downward the aiming nut 52 toward the lamp body 12. Therefore, after the engaged state between the aiming nut 52 and the lamp body 12 is securely kept, the aiming nut 52 can be caused to slide relative to the lamp body 12.

Also, in the embodiment, the output shaft member 64 of the leveling actuator 60 is coupled to the aiming nut 52 in the vertical surface including the axis Ax1 of the aiming screw 46. Therefore, it is possible to set the rotation central axis Lac when aiming the lamp unit 20A in the right and left direction, as the axis extending vertically, so that it is possible to accurately perform the aiming in the right and left direction. Also, thereby, it is possible to easily prevent the excessive force from being applied to the coupled part of the output shaft member 64 of the leveling actuator 60 and the aiming nut 52.

In the embodiment, the aiming nut 52 is formed with the concave part 52*a* for fitting therein the leading end portion 64*a* of the output shaft member 64 of the leveling actuator 60. The concave part 52*a* has the inner peripheral surface shape with which the leading end portion 64*a* of the output shaft member 64 fitted in the concave part 52*a* is relatively displaceable in the upper and lower direction by the predetermined amount. Therefore, after preventing the excessive force from being applied to the coupled part of the output shaft member 64 of the leveling actuator 60 and the aiming nut 52, the movement of the output shaft member 64 in the front and rear direction of the lamp can be transmitted as the rotation of the lamp unit 20A in the upper and lower direction. Thereby, it is possible to smoothly perform the leveling and the aiming in the upper and lower direction and to absorb a mounting error of each member.

Also, the concave part 52*a* of the aiming nut 52 has the inner peripheral surface shape with which the leading end portion 64*a* of the output shaft member 64 fitted in the concave part 52*a* is relatively displaceable in the right and left direction by the predetermined amount. Therefore, even when the rotation central axis Lab of the lamp unit 20A upon the leveling and the aiming in the upper and lower direction extends in a direction inclined relative to the vehicle width direction in the front and rear direction, it is possible to prevent the excessive force from being applied to the coupled part of the output shaft member 64 of the leveling actuator 60 and the aiming nut 52 and to absorb the mounting error of each member.

In the embodiment, the elastic piece 52*f* is formed integrally with the aiming nut 52. However, a configuration where a metallic elastic member is mounted to the aiming nut 52, as a separate member, can also be adopted, for example.

In the embodiment, the two lamp units 20A, 20B are all the projector-type lamp units. However, a parabola type lamp unit can also be adopted.

In the embodiment, the two lamp units 20A, 20B are supported to the lamp body 12 via the bracket 40. However, one or three or more lamp units may be supported to the lamp body 12 via the bracket 40. Also, the lamp unit may be directly supported to the lamp body 12 without via the bracket 40.

In the embodiment, the aiming screw 44, 46 may be configured only by a part extending in the front and rear direction of the vehicle lamp 10 inasmuch as it is supported to the lamp body 12 to be rotatable about the axis extending in the front and rear direction of the vehicle lamp 10, or may have a configuration where a part extending in a direction intersecting with the front and rear direction of the vehicle lamp 10 is coupled to the part extending in the front and rear direction of the vehicle lamp 10 via a gear or the like.

In the embodiment, the output shaft member 64 is disposed to protrude upward or downward from the actuator main body 62. However, the output shaft member 64 is not necessarily required to protrude directly upward or downward. For example, the output shaft member 64 may be disposed to protrude toward a direction inclined from a direction directly above or directly below inasmuch as it is within a range in which the leveling and the aiming in the upper and lower direction and the right and left direction are not to be disturbed.

In the embodiment, the output shaft member 64 is coupled to the aiming nut 52 at the leading end portion thereof. However, the specific coupling structure is not particularly limited.

In the below, modified embodiments are described.

A first modified embodiment is first described.

Figure 8:
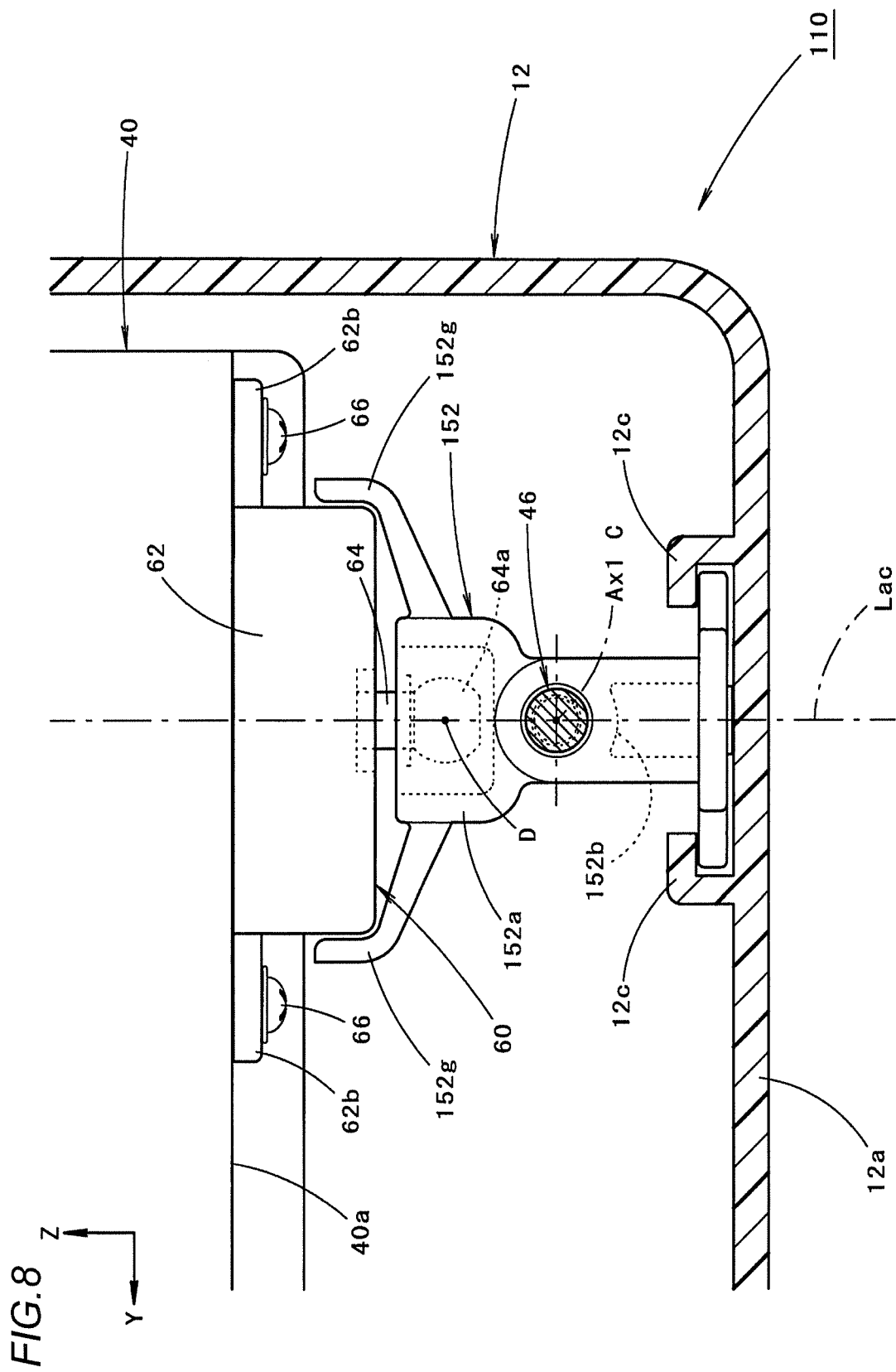
FIG. 8 is a view similar to FIG. 5, depicting a first modified embodiment of the embodiment.

FIG. 8 is a view similar to FIG. 5, depicting main parts of a vehicle lamp 110 in accordance with the first modified embodiment.

As shown in FIG. 8, the basic configuration of the vehicle lamp 110 is similar to the embodiment. However, a configuration of an aiming nut 152 is different from the embodiment.

That is, the aiming nut 152 of the first modified embodiment is different from the aiming nut 52 of the embodiment, in that it is further formed with a pair of left and right actuator engaging pieces 152g extending in a horn shape from a concave part 152a thereof toward both the right and left directions.

Each of the actuator engaging pieces 152g extends obliquely upward from an outer periphery wall of the concave part 152a and then extends vertically.

When the leading end portion 64a of the output shaft member 64 of the leveling actuator 60 is fitted in the concave part 152a of the aiming nut 152, the pair of left and right actuator engaging pieces 152g is loosely engaged with both wall parts of the actuator main body 62 of the leveling actuator 60.

In the meantime, the configuration of the concave part 152a of the aiming nut 152 is similar to the embodiment, and the configurations of the other parts are also similar to the embodiment.

By adopting the configuration of the first modified embodiment, following operational effects can be achieved.

That is, like the first modified embodiment, the pair of left and right actuator engaging pieces 152g is engaged with the actuator main body 62, so that it is possible to prevent in advance the aiming nut 152 from unintentionally rotating about the rotation central axis Lac in the state where the leading end portion 64a of the output shaft member 64 is fitted in the concave part 152a. Thereby, it is possible to keep the direction of the aiming nut 152 substantially constant.

When mounting the bracket 40 to the lamp body 12, the leading end portion 64a of the output shaft member 64 of the leveling actuator 60 fixed and supported to the bracket 40 is fitted in the concave part 152a of the aiming nut 152 and the aiming nut 152 is then threadably engaged with the aiming screw 46. At this time, since the direction of the aiming nut 152 is kept substantially constant, it is possible to make a screw engaging part 152b substantially directly face the leading end portion of the aiming screw 46. Therefore, it is possible to easily perform the operation of threadably engaging the aiming nut 152 and the aiming screw 46, so that it is possible to increase the mounting operability.

Subsequently, a second modified embodiment is described.

Figure 9:
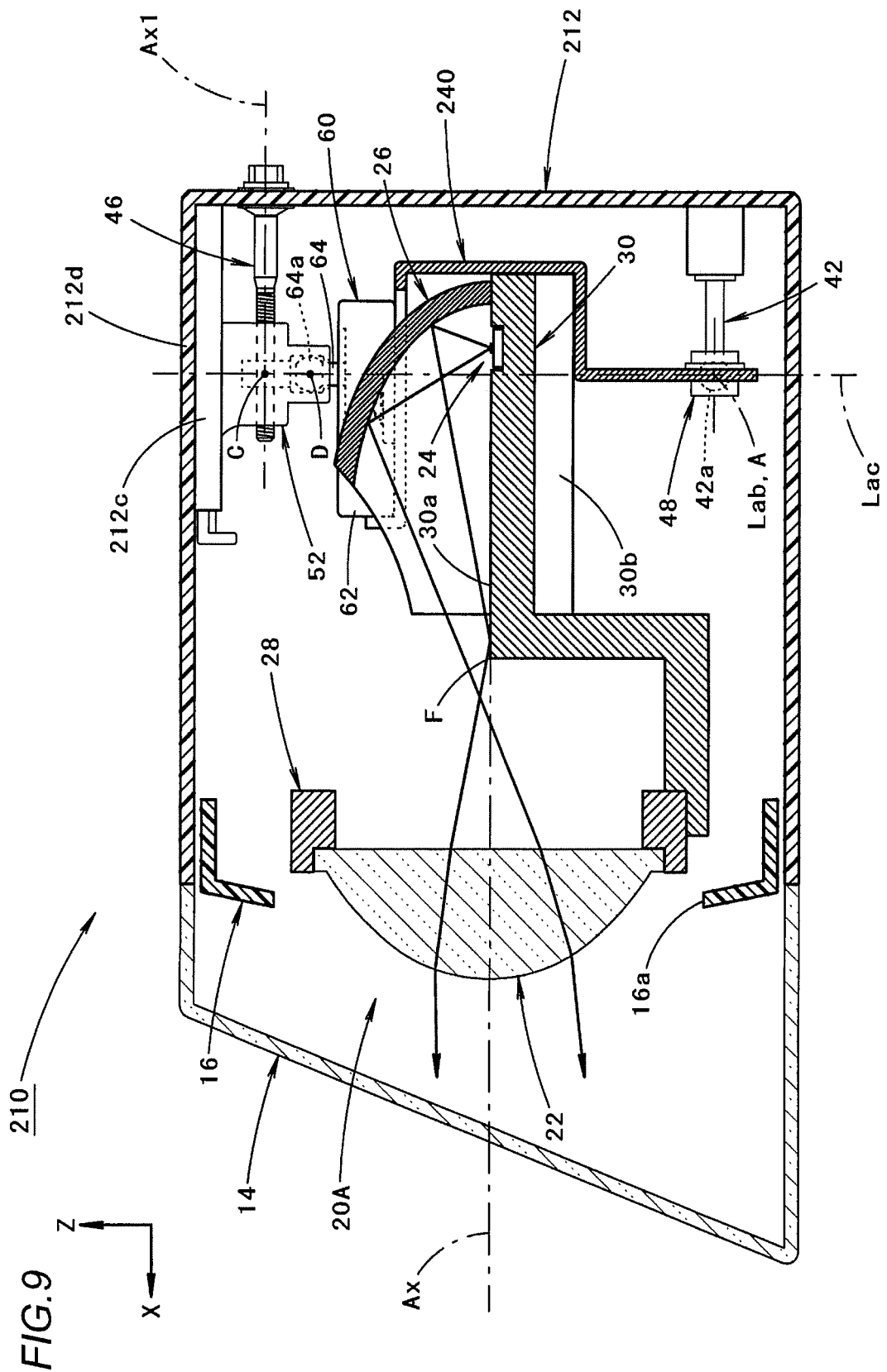
FIG. 9 is a view similar to FIG. 2, depicting a second modified embodiment of the embodiment.

FIG. 9 is a view similar to FIG. 2, depicting a vehicle lamp 210 of the second modified embodiment.

As shown in FIG. 9, the basic configuration of the vehicle lamp 210 is similar to the embodiment. However, in the second modified embodiment, a mechanism for aiming and leveling the lamp unit 20A together with a bracket 240 is disposed with being vertically inverted to the embodiment, and a configuration of a lamp body 212 is also different from the embodiment.

That is, in the second modified embodiment, when aiming the lamp unit 20A in the upper and lower direction, the rotation central axis Lab is located below the lamp unit 20A.

Also in the second modified embodiment, when aiming the lamp unit 20A in the right and left direction, the rotation central axis Lac is a line extending vertically. However, a positional relation between the engaging position A and the threadably engaged position C and coupling position D is opposite to the embodiment.

Accompanied by this, in the second modified embodiment, the pivot 42 and the spherical step bearing 48 are located below the lamp unit 20A, and the aiming screw 46, the aiming nut 50 and the leveling actuator 60 are located above the lamp unit 20A.

In the second modified embodiment, the output shaft member 64 of the leveling actuator 60 is coupled to the aiming nut 52 with being disposed to protrude upward (specifically, directly above) from the actuator main body 62.

Also, in the second modified embodiment, a pair of left and right slide engaging parts 212c configured to support the aiming nut 52 to be slidable in the front and rear direction of the lamp is formed on a lower surface of an upper surface wall 212d of the lamp body 212.

In the meantime, as the configuration for aiming and leveling the lamp unit 20A is vertically inverted, the bracket 240 of the second modified embodiment has a shape different from the bracket 40 of the embodiment.

Even when the configuration of the second modified embodiment is adopted, since the output shaft member 64 of the leveling actuator 60 is disposed to protrude upward from the actuator main body 62 fixed and supported to the lamp unit 20A and is not disposed in series with the aiming screw 46, unlike the related art, it is possible to reduce the summed length of the leveling actuator 60 and the aiming screw 46 in the front and rear direction. Thereby, it is possible to easily secure the space for disposing therein the leveling actuator 60.

Subsequently, a third modified embodiment is described.

Figure 10:
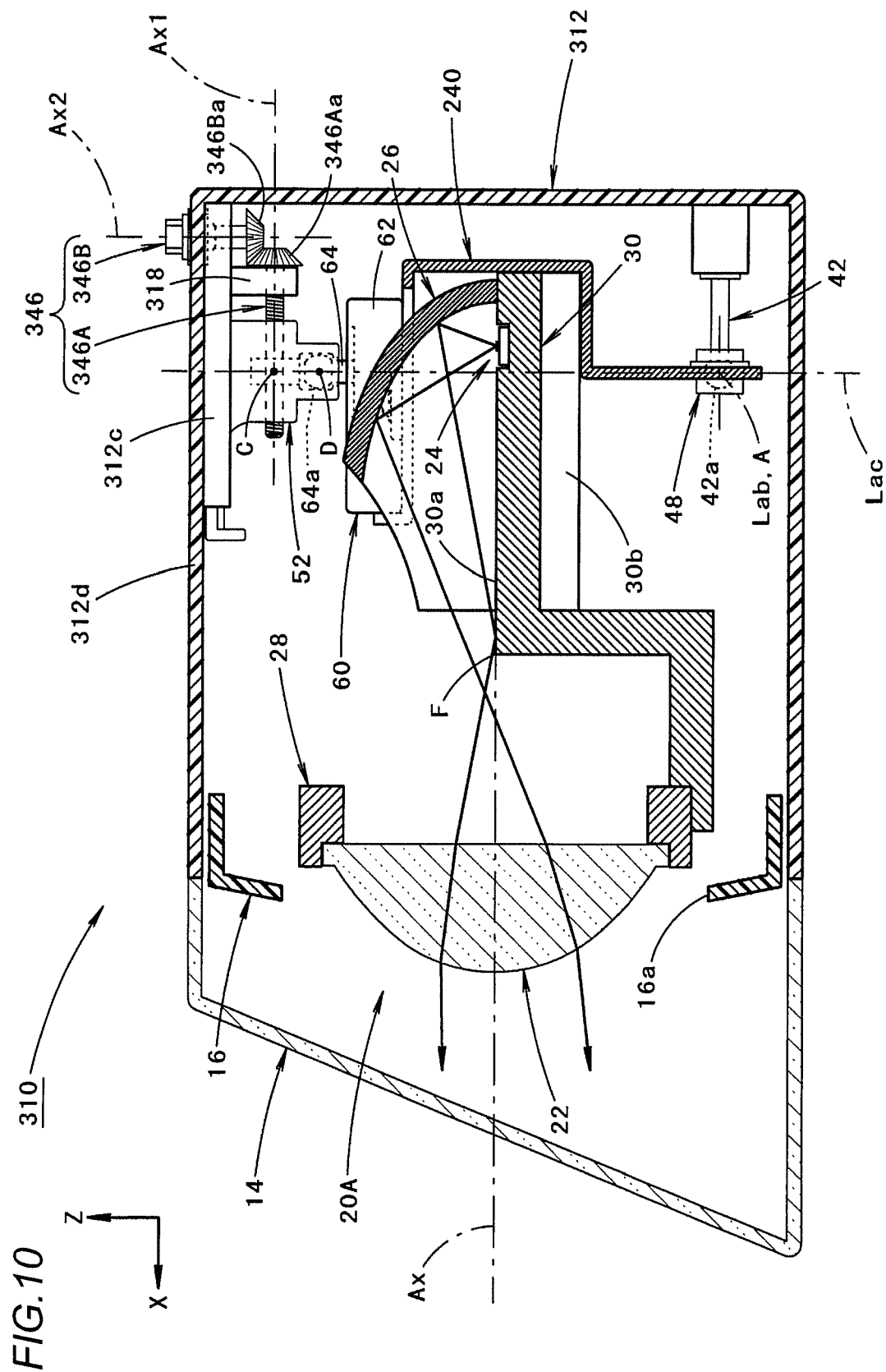
FIG. 10 is a view similar to FIG. 2, depicting a third modified embodiment of the embodiment.

FIG. 10 is a view similar to FIG. 2, depicting a vehicle lamp 310 of the third modified embodiment.

As shown in FIG. 10, the basic configuration of the vehicle lamp 310 is similar to the second modified embodiment. However, a configuration of an aiming screw 346 is different from the second modified embodiment, and a configuration of a lamp body 312 is also correspondingly different from the second modified embodiment.

That is, the aiming screw 346 of the third modified embodiment has a configuration where a screw main body part 346A extending in the front and rear direction of the lamp and a drive shaft part 346B extending in the upper and lower direction are coupled via a pair of bevel gears 346Aa, 346Ba.

The screw main body part 346A is disposed on the axis Ax1 extending in the front and rear direction of the lamp, like the aiming screw 46 of the second modified embodiment. The screw main body part 346A has a shape where a rear part of the aiming screw 46 of the second modified embodiment is cut, and the bevel gear 346Aa is fixed to a rear end portion of the screw main body part.

An upper surface wall 312d of the lamp body 312 is provided with a brace 318 configured to rotatably support the screw main body part 346A in the vicinity of the front of the bevel gear 346Aa.

On the other hand, the drive shaft part 346B is disposed on an axis Ax2 extending perpendicularly to the axis Ax1, and is rotatably supported at an upper end portion thereof to the upper surface wall 312d of the lamp body 312. The bevel gear 346Ba meshes with the bevel gear 346Aa of the screw main body part 346A with being fixed to a lower end portion of the drive shaft part 346Bh.

In the third modified embodiment, when the drive shaft part 346B of the aiming screw 346 is caused to rotate about the axis Ax2, the screw main body part 346A is rotated about the axis Ax1, so that the lamp unit 20A is aimed in the upper and lower direction.

Also in the third modified embodiment, it is possible to achieve the operational effects similar to the second modified embodiment.

Also, when the configuration of the third modified embodiment is adopted, it is possible to easily perform the aiming of the lamp unit 20A in the upper and lower direction by an operation from the above of the vehicle lamp 310.

In the meantime, the numerical values described in the embodiment and the modified embodiments thereof are merely exemplary, and can be appropriately set to different values.

Also, the present disclosure is not limited to the configurations described in the embodiment and the modified embodiments and can adopt the diversely changed configurations.

The invention claimed is:

1. A vehicle lamp comprising:
   a lamp body;
   a lamp unit supported to the lamp body to be aimable in an upper and lower direction and in a right and left direction;
   a leveling actuator configured to rotate the lamp unit in the upper and lower direction independently from rotation by the aiming;
   an aiming screw for aiming the lamp unit in the upper and lower direction, the aiming screw being supported to the lamp body to be rotatable about an axis extending in a front and rear direction of the lamp; and
   an aiming nut mounted to the aiming screw and threadably engaged with the aiming screw,
   wherein the leveling actuator comprises:
   an actuator main body fixed and supported to the lamp unit; and
   an output shaft member supported to the actuator main body to be moveable in the front and rear direction of the lamp,
   wherein the output shaft member is disposed to protrude upward or downward from the actuator main body and is coupled to the aiming nut at a leading end portion of the output shaft member,
   wherein the aiming nut is formed with a concave part for fitting therein the leading end portion of the output shaft member, and
   wherein the concave part has an inner peripheral surface shape with which the leading end portion of the output shaft member fitted in the concave part is relatively displaceable in the upper and lower direction by a predetermined amount.

2. The vehicle lamp according to claim 1,
   wherein the aiming nut is supported to the lamp body to be slidable in the front and rear direction of the lamp.

3. The vehicle lamp according to claim 2,
   wherein the aiming nut is provided with an elastic piece configured to elastically press the aiming nut toward the lamp body in the upper and lower direction.

4. The vehicle lamp according to claim 1,
   wherein the output shaft member is coupled to the aiming nut in a vertical surface including the axis.

5. The vehicle lamp according to claim 1,
   wherein the concave part has an inner peripheral surface shape with which the leading end portion of the output shaft member fitted in the concave part is relatively displaceable in the right and left direction by a predetermined amount.

* * * * *